United States Patent
Henriksson et al.

(10) Patent No.: US 8,499,556 B2
(45) Date of Patent: Aug. 6, 2013

(54) EXHAUST PURIFICATION SYSTEM WITH A DIESEL PARTICULATE FILTER AND A METHOD OF CLEANING SAID FILTER

(75) Inventors: Björn Henriksson, Göteborg (SE); Carl-Johan Karlsson, Göteborg (SE)

(73) Assignee: Volvo Lastvagnar AB, Göteborg (SE)

( * ) Notice: Subject to any disclaimer, the term of this patent is extended or adjusted under 35 U.S.C. 154(b) by 541 days.

(21) Appl. No.: 12/525,823

(22) PCT Filed: Feb. 5, 2007

(86) PCT No.: PCT/SE2007/000104
§ 371 (c)(1),
(2), (4) Date: Sep. 17, 2010

(87) PCT Pub. No.: WO2008/097139
PCT Pub. Date: Aug. 14, 2008

(65) Prior Publication Data
US 2011/0041815 A1    Feb. 24, 2011

(51) Int. Cl.
*F02D 23/00*    (2006.01)
*F01N 3/00*     (2006.01)

(52) U.S. Cl.
USPC .................................. 60/602; 60/295; 60/286

(58) Field of Classification Search
USPC .......................................... 60/602, 295, 286
See application file for complete search history.

(56) References Cited

U.S. PATENT DOCUMENTS

| | | | |
|---|---|---|---|
| 7,104,048 B2 | 9/2006 | Brown | 60/286 |
| 7,343,735 B2 * | 3/2008 | Wang et al. | 60/286 |
| 7,430,856 B2 * | 10/2008 | Miyazaki et al. | 60/295 |
| 7,680,586 B2 * | 3/2010 | Ruth et al. | 701/109 |

(Continued)

FOREIGN PATENT DOCUMENTS

| | | |
|---|---|---|
| FR | 2900964 A3 | 11/2007 |
| JP | 2004011428 A * | 1/2004 |

(Continued)

OTHER PUBLICATIONS

International Search Report for corresponding International Application PCT/SE2007/000104, Date of actual completion of the internal Search on Oct. 8, 2007.

(Continued)

*Primary Examiner* — Thai Ba Trieu
(74) *Attorney, Agent, or Firm* — WRB-IP LLP

(57) ABSTRACT

A diesel engine system and a method for operating said system are provided. The diesel engine system includes a diesel engine provided with an exhaust conduit including a controllable supercharger located upstream of a catalytic converter, a fuel injector located between the supercharger and the catalytic converter, a diesel particulate filter located downstream of the catalytic converter, and a control unit for controlling the engine system. The control unit is arranged to determine that a regeneration of the particulate filter is required, which regeneration is initiated when a predetermined condition is fulfilled. The fuel injector is arranged to inject a predetermined amount of fuel during a first stage of the regeneration, and the supercharger is arranged to vary the flow rate of exhaust during the injection of fuel. The catalytic converter is arranged to combust the injected fuel, and the combusted fuel is arranged to burn particulates trapped within the diesel particulate filter.

15 Claims, 2 Drawing Sheets

U.S. PATENT DOCUMENTS

| | | | |
|---|---|---|---|
| 7,765,793 B2 * | 8/2010 | Nishiyama et al. | 60/295 |
| 7,792,631 B2 * | 9/2010 | Bottcher et al. | 701/108 |
| 8,005,605 B2 * | 8/2011 | Yasui | 701/109 |
| 2003/0200745 A1 | 10/2003 | Van Nieuwstadt et al. | 60/295 |
| 2004/0006977 A1 * | 1/2004 | Nakatani et al. | 60/295 |
| 2005/0274104 A1 | 12/2005 | Bromberg et al. | 60/286 |
| 2006/0021331 A1 | 2/2006 | Cizeron et al. | 60/295 |
| 2006/0053778 A1 | 3/2006 | Asanuma et al. | 60/295 |
| 2006/0242950 A1 * | 11/2006 | Wang et al. | 60/295 |
| 2007/0130923 A1 | 6/2007 | Dye et al. | 60/295 |
| 2007/0271918 A1 * | 11/2007 | Nishiyama et al. | 60/600 |
| 2007/0289289 A1 * | 12/2007 | Kojima et al. | 60/280 |
| 2008/0016851 A1 * | 1/2008 | McCarthy et al. | 60/286 |
| 2009/0070003 A1 * | 3/2009 | Thuault et al. | 60/286 |
| 2010/0275581 A1 * | 11/2010 | Wada et al. | 60/295 |
| 2010/0275582 A1 * | 11/2010 | Wada et al. | 60/295 |
| 2011/0167803 A1 * | 7/2011 | Funk et al. | 60/286 |
| 2011/0167804 A1 * | 7/2011 | Arvan | 60/286 |
| 2011/0265450 A1 * | 11/2011 | Barasa | 60/286 |
| 2011/0265458 A1 * | 11/2011 | Barasa | 60/286 |
| 2012/0144802 A1 * | 6/2012 | Driscoll et al. | 60/295 |

FOREIGN PATENT DOCUMENTS

| | | | |
|---|---|---|---|
| JP | 2005127260 A * | 5/2005 | |
| JP | 2006105020 A | 4/2006 | |
| WO | 2005005797 A2 | 1/2005 | |
| WO | WO 2005095767 A1 * | 10/2005 | |

OTHER PUBLICATIONS

International Preliminary Report on Patentability for corresponding International Application PCT/SE2007/000104, Date of completion report on Apr. 22, 2009.

* cited by examiner

EXHAUST PURIFICATION SYSTEM WITH A DIESEL PARTICULATE FILTER AND A METHOD OF CLEANING SAID FILTER

BACKGROUND AND SUMMARY

The present invention relates to diesel engines, and more particularly to diesel particulate filter (DPF) regeneration.

Diesel engines have higher efficiency than gasoline engines due to the increased compression ratio of the diesel combustion process and the higher energy density of diesel fuel. As a result, a diesel engine provides improved gas mileage than an equivalently sized gasoline engine.

However, the diesel combustion cycle produces particulates that are preferably filtered from the exhaust gases. A diesel particulate filter (DPF) is usually arranged in the exhaust stream to filter the diesel particulates from the exhaust. In order to maintain a desired function of the DPF it must be regenerated at regular intervals to remove the trapped diesel particulates. During regeneration, the diesel particulates are burned within the DPF to enable the DPF to continue its filtering function.

According to one method, regeneration is carried out by injecting diesel fuel into the cylinder after the main combustion event. The post-combustion injected fuel is expelled from the engine with the exhaust gases and is combusted over catalysts placed in the exhaust stream. The heat released during the fuel combustion on the catalysts increases the exhaust temperature, which burns the trapped soot particles in the DPF. This approach utilizes the common rail fuel injection system and does not require additional fuel injection hardware. An arrangement for carrying out this type of regeneration is known from U.S. Pat. No. 7,104,048.

FR 2 900 964 discloses an internal combustion engine provided with an exhaust gas after treatment system. In said document compressed air from the turbo compressor is injected into the exhaust system for increasing the wetting area of the fuel which is provided upstream the catalytic system.

Engine emissions are typically reduced by lowering cylinder temperatures, which occur when ignition timing is retarded. Retarding ignition timing, however, triggers the combustion process at a non-optimal point. As a result, engine efficiency, fuel economy and/or performance are reduced.

Exhaust gas recirculation (EGR) is another, more preferable method for reducing engine emissions. EGR involves re-circulating exhaust gases back into the cylinders, which limits the amount of oxygen available for combustion and lowers cylinder temperatures. EGR enables ignition timing to remain at an optimum point, which improves fuel economy and/or performance.

A problem with the use of conventional fuel injection into the cylinders is that the EGR system must be disabled during DPF regeneration to prevent the post-injected fuel from being re-circulated into the engine. The re-circulation of the post injection fuel may damage the engine and/or the EGR system. Because the EGR system is disabled during DPF regeneration, the engine emission rates may increase during DPF regeneration.

According an alternative method, DPF regeneration is carried out by injecting diesel fuel directly into an exhaust conduit upstream of the catalysts and the DPF using a separate fuel injector. This arrangement does not interfere with the operation of the EGR system. However, a problem with this method is that the diesel fuel causes wetting of the inner walls of the exhaust conduit. As the diesel fuel is injected a shorter distance upstream of the catalysts, the injected fuel has less time to evaporate. A delayed evaporation of the diesel fuel may cause a reduced heat release from the catalysts and thereby an insufficient DPF regeneration. This may in turn force the system to inject a larger amount of fuel or to carry out additional DPF regenerations to maintain a satisfactory function of the DPF.

It is desirable to provide an improved method for DPF regeneration that will avoid the above problems and ensure a sufficient heat release from the catalysts to achieve sufficient cleaning of the DPF even at low engine load.

The invention relates, according to an aspect thereof, to a method for operating a diesel engine provided with a particulate filter and a diesel engine system with means for regenerating such a particulate filter.

According to a preferred embodiment, the invention relates to a method of operating a diesel engine provided with an exhaust conduit comprising a controllable supercharger located upstream of a catalytic converter, a fuel injector located downstream of the supercharger and a diesel particulate filter located downstream of the catalytic converter. The method may comprise the steps of:

determining that a regeneration cycle is required for the diesel particulate filter;

injecting a predetermined amount of fuel over a period of time into the exhaust conduit upstream of the catalytic converter;

controlling the flow rate of exhaust through the supercharger during the period of fuel injection;

combusting said fuel to burn particulates trapped within the diesel particulate filter.

Regeneration of the diesel particulate filter, hereinafter referred to as the DPF, is carried out by injecting diesel fuel directly into an exhaust conduit upstream of the catalysts and the DPF using a separate fuel injector. Fuel under pressure may be supplied from an existing fuel rail or a dedicated fuel pump drawing diesel fuel from a tank. This arrangement does not interfere with the operation of an existing EGR system. The injected fuel is combusted in the catalytic converter and the heat released by this combustion will cause the-particulate matter, or soot, in the DPF to combust and burn.

When the diesel fuel is injected into the exhaust conduit a certain amount of wetting of the inner surface of the conduit may occur, whereby a film of said fuel is deposited on the wall of the conduit. Wetting is most likely to occur during engine operating conditions where the temperature of the inner surface is relatively low. Examples of such conditions may be periods of relatively low engine load, when the vehicle is stationary with the engine idling, when the vehicle is operated at a constant, relatively low speed, or when the vehicle is coasting. Depending on the relative location of the components in the system, a low ambient temperature may also affect the rate of evaporation.

When the flow rate is constant, injected fuel will cause wetting of a relatively small area over a limited section of the inner wall of the exhaust conduit. If the flow rate is maintained constant, a relatively thick film of fuel will be deposited on said limited section of the wall. At low temperature conditions this film may take a relatively long time to evaporate. As the heat release to the exhaust as the evaporated fuel is combusted in the catalytic converter will take place over a longer period of time, the temperature of the exhaust downstream of the catalytic converter will be correspondingly lower. This may result in an incomplete combustion of the particles in the DPF. As stated above, it may be necessary to increase the amount of injected fuel or to carry out the regeneration cycle more frequently to overcome these problems.

As the diesel fuel is injected a relatively short distance upstream of the catalytic converter, it is desirable to ensure that the injected fuel has evaporated before it reaches the catalytic converter. It is also desirable that the evaporation occurs as quickly as possible after the fuel injection in order to obtain a sufficient heat release from the catalytic converter to completely combust the particles collected in the DPF. This is achieved by controlling the supercharger to vary the flow rate of exhaust while the fuel is being injected. By varying the flow rate of the exhaust, the area of the inner wall subjected to wetting is enlarged and the film of fuel will evaporate at a satisfactory rate.

According to a first example, the control unit may control the supercharger to increase or decrease the flow rate of the exhaust continuously during the period of fuel injection. By increasing the flow rate from an initial value, the area of wetting will be displaced downstream relative to a first area of wetting where a film of injected fuel will be deposited at the initial flow rate. Similarly, by decreasing the flow rate from an initial value, the area of wetting will be displaced upstream relative to said first area of wetting.

According to a second example, the control unit may control the supercharger to pulse the flow rate of exhaust continuously during the period of fuel injection. When pulsing the flow rate, an initial flow rate will be increased in a first step, whereby the area of wetting displaced downstream relative to the first area of wetting. Subsequently, the flow rate will return to the initial flow rate. In a second step, the flow rate will be decreased whereby the area of wetting displaced upstream relative to the first area of wetting. Subsequently, the flow rate will return to the initial flow rate. Either of the first or second steps may be used as the initial step. One or more such pulses, comprising a first and a second step, may be carried out in sequence.

The rate of control of the flow rate of the exhaust in the above examples is dependent on a number of parameters, such as the minimum and/or maximum allowable flow rate through the supercharger in relation to the initial flow rate, the type of supercharger used, the size and shape of the exhaust conduit downstream of the fuel injector, the relative distance between the first area of wetting and the catalytic converter, etc.

Changing the flow rate through the supercharger may also affect the direction of flow, for instance a rotary component of the flow referred to as swirl. Mixing of the exhaust gas and the fuel injected into the exhaust conduit is enhanced when the flow is turbulent. The swirl component can be influenced by a number of factors, such as the shape of the exhaust conduit, the exhaust flow through the supercharger or the positioning of the fuel injector. When the flow rate of the exhaust is increased, the swirl component in the exhaust stream may also increase. An increased swirl component may enlarge the area of wetting described above, which in turn increase the rate of evaporation.

Suitable superchargers for this purpose may be a variable geometry turbocharger (VGT) or an electrically driven or otherwise controllable turbo charging unit located in the exhaust conduit downstream of the engine.

According to a third example, the control unit may control an engine related parameter or auxiliary components driven by the engine in order to vary the mass flow rate and/or the temperature of the exhaust through the supercharger during the period of fuel injection. This may be achieved in a number of different ways, wherein a few examples are listed below. For instance, the exhaust flow rate may be varied by controlling the fuel injection into each cylinder. Alternatively the flow rate is varied by instructing the control unit to actively change the engine speed, which allows regeneration when the vehicle is stationary. The engine speed, and thereby the exhaust flow rate, can also be varied by activating an auxiliary load, such as a generator, radiator fan or air-conditioning unit. According to a further example, the control unit may control a number of actuators in the intake and/or exhaust conduits, such as a throttle in the air intake or an EGR valve in the exhaust conduit.

One or more of the above examples may be used for controlling the supercharger itself or the flow rate of exhaust through the supercharger to vary at least the flow rate during the period of fuel injection during regeneration of the DPF.

The regeneration process may be controlled with respect to a known or predetermined exhaust flow rate. When the flow rate is known, a calculated or experimentally determined amount of fuel required for regenerating the DPF is injected into the exhaust conduit over a predetermined period of time. The period of time may be dependent on the rate of evaporation for a current temperature of the exhaust conduit, the temperature of the catalytic converter and/or the method selected for controlling the flow rate of the exhaust. Using the above method allows the amount of injected diesel fuel required for regeneration of the DPF to be minimized. At the same time, a substantially complete regeneration of the DPF allows the period of time between each consecutive regeneration to be maximized.

The method is preferably, but not necessarily carried out when it has been determined that the engine is operated in a steady state. The control unit may carry out this step prior to performing the injection, using existing sensors used for monitoring various engine related parameters. The regeneration may be carried out automatically under the control of the control unit, when a regeneration of the DPF is required. Alternatively, manual initiation of the injection by the driver may be allowed when the control unit has determined that a regeneration of the DPF is required and that the engine is operated in a steady state. The state of the DPF is monitored by the control unit and regeneration is preferably carried out immediately prior to the time when it is determined that the DPF is full.

The invention also relates to a diesel engine system for carrying out the above method. The diesel engine system comprises a diesel engine provided with an exhaust conduit comprising a controllable supercharger located upstream of a catalytic converter, a fuel injector located between the supercharger and the catalytic converter, a diesel particulate filter located downstream of the catalytic converter, and a control unit for controlling the engine system. A control unit is arranged to determine that a regeneration of the particulate filter is required, which regeneration is initiated when a predetermined condition is fulfilled. The fuel injector is arranged to inject a predetermined amount of fuel during a first stage of the regeneration. At the same time, the supercharger is arranged to vary the flow rate of exhaust during the injection of fuel. Finally, the catalytic converter is arranged to combust the injected fuel, and that the combusted fuel is arranged to burn particulates trapped within the diesel particulate filter.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF DRAWINGS

In the following text, the invention will be described in detail with reference to the attached drawings. These schematic drawings are used for illustration only and do not in any way limit the scope of the invention. In the drawings.

DETAILED DESCRIPTION

Figure 1:
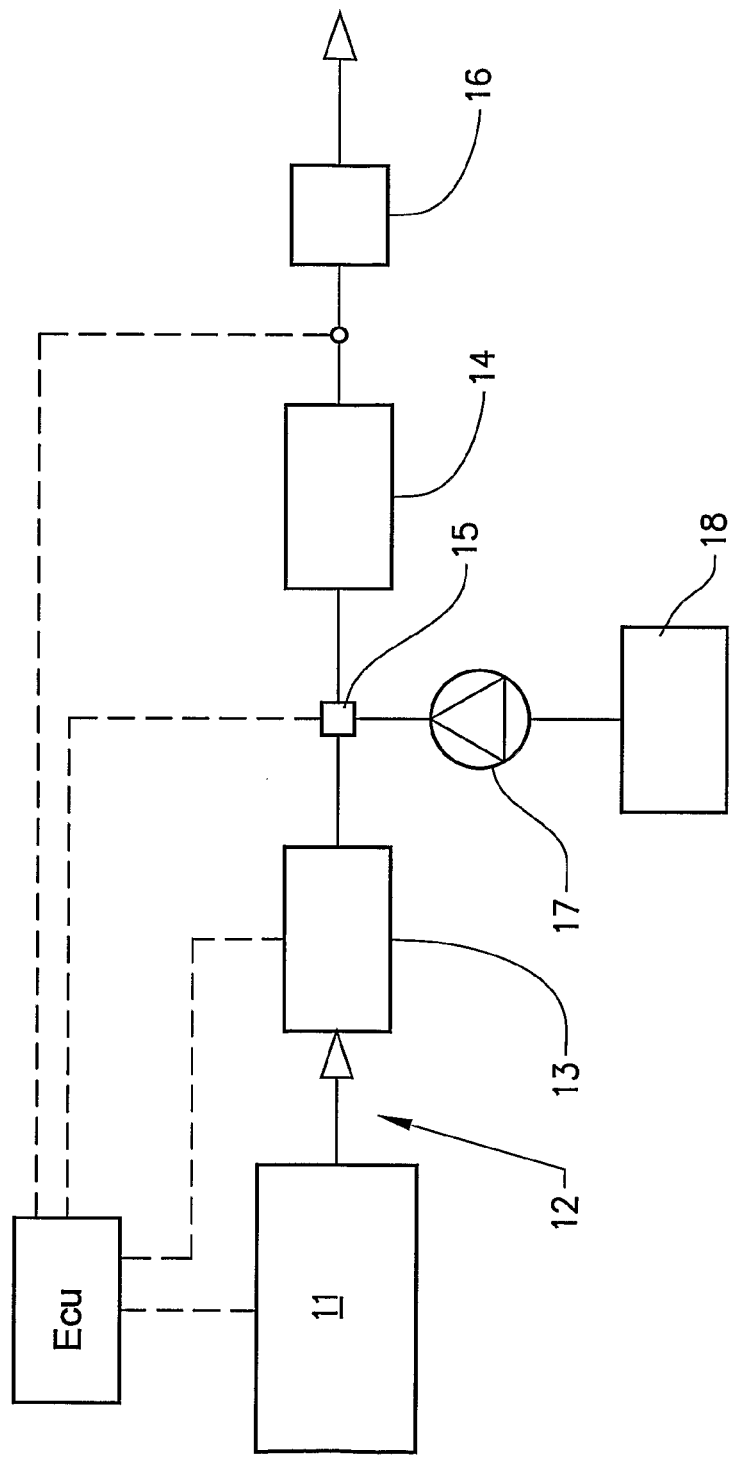
FIG. 1 shows a diesel engine system according to a first embodiment of the invention.

FIG. 1 shows a diesel engine system according to a first embodiment of the invention. The system comprises a diesel engine 11 provided with an exhaust conduit 12 comprising a controllable supercharger 13 located upstream of a catalytic converter 14. In this example the supercharger is a variable geometry turbocharger 13. A fuel injector 15 is located downstream of the turbocharger 13 and a diesel particulate filter 16 is located downstream of the catalytic converter 14. An electronic control unit ECU is provided for controlling the component parts of the engine system. The electronic control unit ECU is arranged to determine that the particulate filter 16 a predetermined amount of soot and that a regeneration of is required. The regeneration is initiated by the electronic control unit ECU when a predetermined condition is fulfilled. In this case, the condition is that the engine 11 is operated in a steady state at a constant engine speed. Examples of such conditions may be periods of relatively low engine load, when the vehicle is stationary with the engine idling, when the vehicle is operated at a constant, relatively low speed, or when the vehicle is coasting. The fuel injector 15 is supplied with fuel from a pump 17 connected to a fuel tank 18 on the vehicle. Alternatively, fuel under pressure may be supplied to the injector from an existing fuel rail used for fuelling the engine. The fuel injector 15 is arranged to inject a predetermined amount of fuel during a first stage of the regeneration. At the same time, the turbocharger 13 is arranged to vary the flow rate of exhaust during the injection of fuel. Finally, the catalytic converter 14 is arranged to combust the injected fuel, and that the combusted fuel is arranged to burn particulates trapped within the diesel particulate filter 15.

In operation, the electronic control unit ECU is arranged to determining that a regeneration cycle is required for the diesel particulate filter 16. The determination can be made based on experimental data, the operating time of the engine or an output from a sensor located in or adjacent the filter 16. When the engine 11 is operated under steady state conditions, the electronic control unit ECU is arranged to actuate the fuel injector 15 in order to inject a predetermined amount of fuel over a period of time into the exhaust conduit 12 upstream of the catalytic converter 14. The amount of fuel and the duration of the injection are determined by the fuel pressure delivered by the pump 17, the current exhaust flow rate through the exhaust conduit 12, and the temperature required for regenerating the diesel particulate filter 15. At substantially the same time as the fuel injector 15 is actuated, the electronic control unit ECU is arranged to control the turbocharger 13 to vary the flow rate of exhaust during the period of fuel injection.

Figure 2:
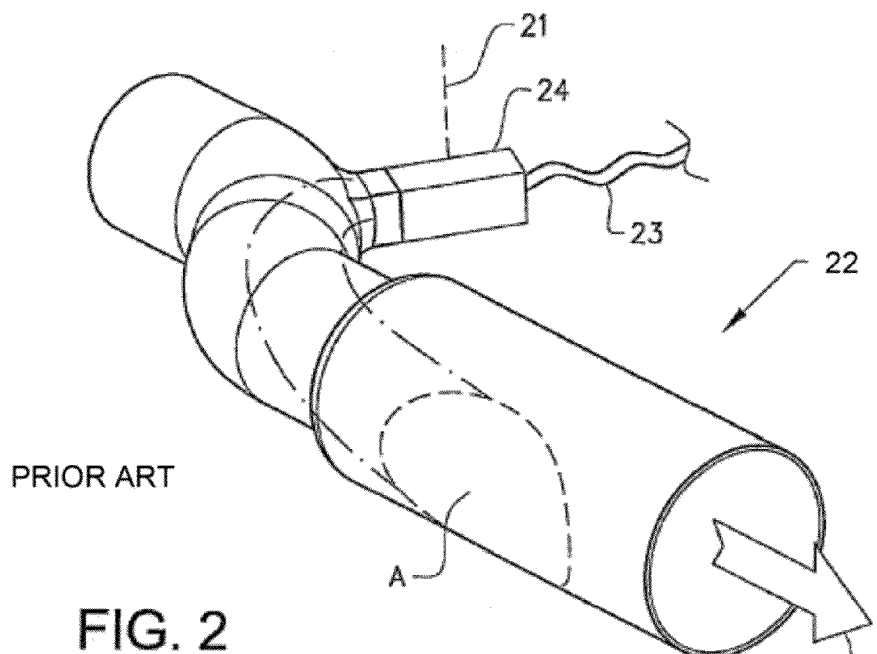
FIG. 2 shows a schematic illustration of a section of an exhaust conduit in a prior art system.

FIG. 2 shows a schematic illustration of a section of an exhaust conduit in a prior art system. FIG. 2 shows an area A where wetting occurs on an inner surface of the exhaust conduit 22 downstream of a fuel injector 24. The fuel injector is controlled by a control unit (not shown) via an electric wire 21 and is supplied with fuel through a conduit 23 from a pump (not shown). When the diesel fuel is injected into the exhaust conduit 22 a certain amount of wetting of the inner surface of the exhaust conduit 22 may occur, whereby a film of said fuel is deposited on a limited area A the inner wall of the exhaust conduit 22. Wetting is most likely to occur during engine operating conditions where the temperature of the inner surface is relatively low. Depending on the relative location of the components in the system, a low ambient temperature may also affect the rate of evaporation. A relatively thick film of fuel deposited on the area A can under certain circumstances take a long time to evaporate. This will in turn result in a reduced heat release from a subsequent catalyst and an insufficient regeneration of a diesel particulate filter downstream of the catalyst.

Figure 3:
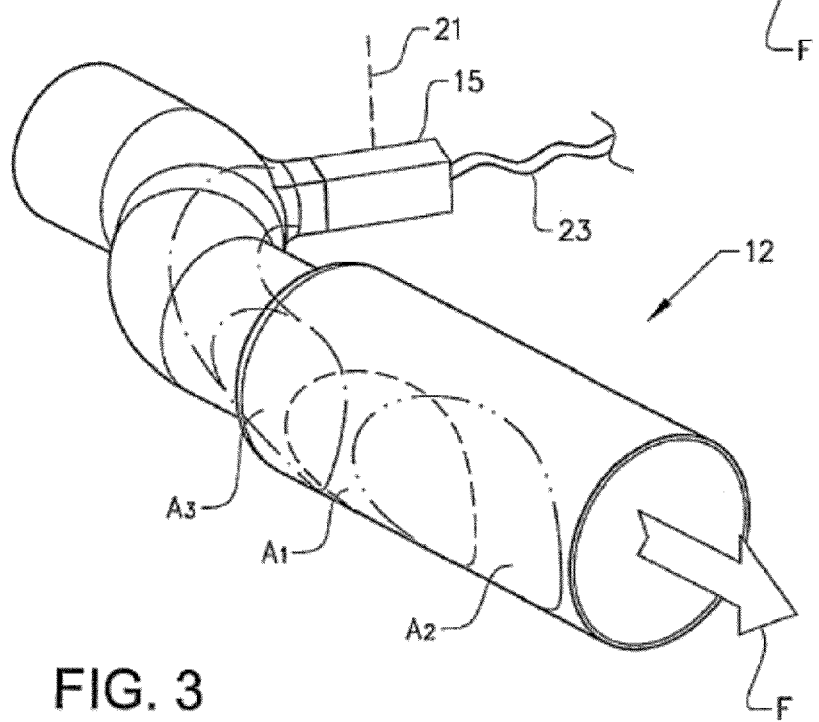
FIG. 3 shows a schematic illustration of a section of an exhaust conduit in a system according to the invention.

Using reference numerals of FIG. 1, FIG. 3 shows a schematic illustration of a section of an exhaust conduit 12 in a system according to the invention. According to a first example, the electronic control unit ECU of FIG. 1 controls the turbocharger 13 to increase or decrease the flow rate of the exhaust continuously during the period of fuel injection. By increasing the flow rate from an initial, steady state value, an initial, first area Ai of wetting will be displaced downstream towards a second area A2 of wetting. A film of injected fuel will be deposited on the inner wall of the exhaust conduit 22 along the way. Alternatively, by decreasing the flow rate from an initial value, the first area Ai of wetting will be displaced upstream towards a third area A3 of wetting.

The initial position of the area of wetting will vary with the exhaust flow rate. Hence, at a relatively high flow rate the initial area of wetting can be located in the second area A2 of wetting. A decrease of the flow rate can be used to displace the area of wetting towards the first area A-i, or even towards the third area A3 depending on the amount of fuel to be injected and the duration of the injection. Similarly, if the flow rate is relatively low, the initial area of wetting can be located in the third area A3 of wetting. An increase of the flow rate can be used to displace the area of wetting towards the first area A-i, or even towards the second area A2.

According to a second example, the electronic control unit ECU may control the turbocharger 13 to pulse the flow rate of exhaust continuously during the period of fuel injection. When the flow rate is pulsed, an initial flow rate will be increased in a first step, whereby the first area Ai of wetting is displaced downstream towards the second area A2 of wetting. Subsequently, the turbocharger 13 is controlled so that the flow rate will return to the initial flow rate and the fuel is again deposited in the first area A-i. In a second step, the flow rate will be decreased whereby the first area Ai of wetting is displaced upstream towards the third area A3 of wetting. Subsequently, the turbocharger 13 is controlled so that the flow rate will return to the initial flow rate and the fuel is again deposited in the first area A-i. Either of the first or second steps may be used as the initial step. One or more such pulses, comprising a first and a second step, may be carried out in sequence.

The rate of control of the flow rate of the exhaust in the above examples is dependent on a number of parameters, such as the minimum and/or maximum allowable flow rate through the turbocharger in relation to the initial flow rate, the type of supercharger used, the size and shape of the exhaust conduit downstream of the fuel injector, the relative distance between the first area of wetting and the catalytic converter, etc. Similarly, the size and shape of the areas of wetting and their locations will vary with factors such as the shape of the exhaust conduit, the flow rate and the fuel injection pressure. The above embodiments are given by way of example only.

The injected and evaporated fuel will subsequently be combusted in the catalytic converter and the heat released by this combustion will cause the particulate matter, or soot, trapped in the diesel particulate filter to combust and burn.

The invention is not limited to the above embodiments.

The invention claimed is:

1. A method of operating, a diesel engine provided with an exhaust conduit comprising a controllable supercharger located upstream of a catalytic converter, a fuel injector located downstream of the supercharger and a diesel particulate filter located downstream of the catalytic converter, the method comprising:
   determining that a regeneration cycle is required for the diesel particulate filter;
   injecting a predetermined amount of fuel over a period of time into the exhaust conduit upstream of the catalytic converter;
   controlling the supercharger to vary a flow rate of exhaust during the period of fuel injection to control size, shape, and location of an area of fuel wetting of an inner surface of the exhaust conduit; and
   combusting the fuel to burn particulates trapped within the diesel particulate filter.

2. A method of operating a diesel engine provided with an exhaust conduit comprising a controllable supercharger located upstream of a catalytic converter, a fuel injector located downstream of the supercharger and a diesel particulate filter located downstream of the catalytic converter, the method comprising:
   determining that a regeneration cycle is required for the diesel particulate filter;
   injecting a predetermined amount of fuel over a period of time into the exhaust conduit upstream of the catalytic converter;
   controlling the supercharger to pulse the flow rate of exhaust continuously during the period of fuel injection; and
   combusting the fuel to burn particulates trapped within the diesel particulate filter.

3. The method according to claim 2, comprising controlling the supercharger to increase or decrease the flow rate of exhaust continuously during the period of fuel injection.

4. The method according, to claim 2, comprising controlling an engine related parameter to vary the flow rate of exhaust continuously during the period of fuel injection.

5. The method according to claim 2, comprising controlling an auxiliary component driven by the engine to vary the flow rate of exhaust continuously during the period of fuel injection.

6. A method of operating a diesel engine provided with an exhaust conduit comprising a controllable supercharger located upstream of a catalytic converter, a fuel injector located downstream of the supercharger and a diesel particulate filter located downstream of the catalytic converter, the method comprising:
   determining that a regeneration cycle is required for the diesel particulate filter;
   injecting a predetermined amount of fuel over a period of time into the exhaust conduit upstream of the catalytic converter;
   controlling the supercharger to pulse the flow rate of exhaust continuously during the period of fuel injection;
   combusting the fuel to burn particulates trapped within the diesel particulate filter; and
   determining that the engine is operated in a steady state prior to performing the injection.

7. The method according to claim 6, comprising allowing manual initiation of the injection when the engine is operated in a steady state.

8. A diesel engine system, comprising a diesel engine provided with an exhaust conduit comprising a controllable supercharger located upstream of a catalytic converter, a fuel injector located between the supercharger and the catalytic converter, a diesel particulate filter located downstream of the catalytic converter, and a control unit for controlling the engine system, wherein the control unit is arranged to determine that a regeneration of the particulate filter is required, which regeneration is initiated when a predetermined condition is fulfilled, that the fuel injector is arranged to inject a predetermined amount of fuel during a first stage of the regeneration, that the control unit is arranged to control the supercharger to vary a flow rate of exhaust during the period of fuel injection to control size, shape, and location of an area of fuel wetting of an inner surface of the exhaust conduit, and the catalytic converter is arranged to combust the injected fuel and that the combusted fuel is arranged to burn particulates trapped within the diesel particulate filter.

9. A diesel engine system, comprising a diesel engine provided with an exhaust conduit comprising a controllable supercharger located upstream of a catalytic converter, a fuel injector located between the supercharger and the catalytic converter, a diesel particulate filter located downstream of the catalytic converter, and a control unit for controlling the engine system, wherein the control unit is arranged to determine that a regeneration of the particulate filter is required, which regeneration is initiated when a predetermined condition is fulfilled, that the fuel injector is arranged to inject a predetermined amount of fuel during a first stage of the regeneration, the control unit being arranged to control the supercharger to pulse the flow rate of exhaust continuously during the period of fuel injection, that the catalytic converter is arranged to combust the injected fuel and that the combusted fuel is arranged to burn particulates trapped within the diesel particulate filter, wherein predetermined condition is fulfilled when the engine is operated at a steady state.

10. A diesel engine system, comprising a diesel engine provided with an exhaust conduit comprising a controllable supercharger located upstream of a catalytic converter, a fuel injector located between the supercharger and the catalytic converter, a diesel particulate filter located downstream of the catalytic converter, and a control unit for controlling the engine system, wherein the control unit is arranged to determine that a regeneration of the particulate filter is required, which regeneration is initiated when a predetermined condition is fulfilled, that the fuel injector is arranged to inject a predetermined amount of fuel during a first stage of the regeneration, the control unit being arranged to control the supercharger to pulse the flow rate of exhaust continuously during the period of fuel injection, that the catalytic converter is arranged to combust the injected fuel and that the combusted fuel is arranged to burn particulates trapped within the diesel particulate filter.

11. The diesel engine system according to claim 10, wherein the supercharger is controlled to increase or decrease the flow rate of exhaust continuously during the period of fuel injection.

12. The diesel engine system according to claim 10, wherein the supercharger is a controllable turbocharger.

13. The diesel engine system according to claim 10, wherein the supercharger is a variable geometry turbocharger.

14. The diesel engine system according to claim 10, wherein the control unit is arranged to control the engine speed to vary the flow rate of exhaust during the period of fuel injection.

15. The diesel engine system according to claim 10, wherein the control unit is arranged to control an auxiliary component driven by the engine to vary the flow rate of exhaust during the period of fuel injection.

* * * * *